Figure 1:
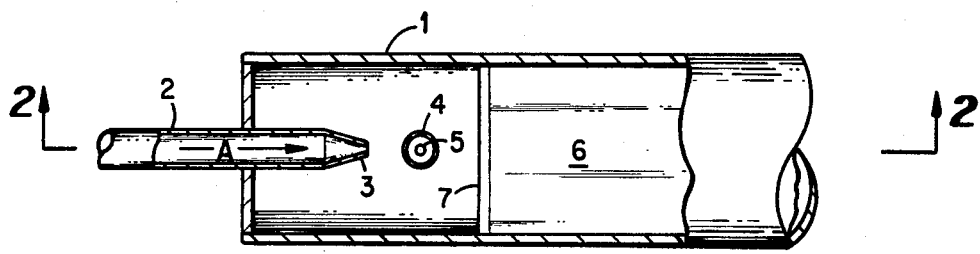

United States Patent [19]

Anderson

[11] 4,097,247

[45] Jun. 27, 1978

[54] ISOTOPE SEPARATION PROCESS

[75] Inventor: James B. Anderson, Hamden, Conn.

[73] Assignee: The United States of America as represented by the United States Department of Energy, Washington, D.C.

[21] Appl. No.: 298,431

[22] Filed: Oct. 10, 1972

[51] Int. Cl.$^2$ .............................................. B01D 57/00
[52] U.S. Cl. ........................................... 55/17; 55/72; 55/467; 55/83; 55/434
[58] Field of Search ....................... 55/17, 83, 72, 434, 55/467

[56] References Cited

U.S. PATENT DOCUMENTS 3,616,596  11/1971  Campargue ............................... 55/17

*Primary Examiner*—Stephen J. Lechert, Jr.
*Attorney, Agent, or Firm*—Dean E. Carlson; Stephen D. Hamel; David E. Breeden

[57] ABSTRACT

Apparatus and method are specified for the separation of isotopes of elements and their compounds and other mixtures in gaseous form, for example, the separation of mixtures of uranium isotopes U-235 and U-238 as uranium hexafluorides. The separation is effected by passing a stream of the gaseous isotopic elements or compounds at high velocity into a low-molecular-weight stopping gas. The heavier isotopes travel farther through the stopping gas than the light isotopes in a given time and a spatial separation is thus achieved. The high velocity isotope stream is produced by acceleration of the isotope mixture in a low-molecular-weight carrier gas during passage through a nozzle into the region of the stopping gas. A flow of the stopping gas is maintained to remove the isotopes from the region of the high velocity stream. This flow is subsequently split into streams each enriched in one of the isotopes. The stopping gas is maintained at low temperature, either by expansion or by conventional refrigeration techniques, to enhance the degree of separation.

10 Claims, 3 Drawing Figures

ISOTOPE SEPARATION PROCESS

This invention is directed to the separation of gas mixtures of various compositions and is particularly concerned with the separation of chemical isotopes of differing molecular weight such as the uranium-235 and uranium-238 hexafluorides for which current separation processes require large amounts of energy and equipment.

The continuing growth in the world's population and the growth of energy consumption by domestic, commercial and industrial users has led to greater demands for electrical power generation which demands are increasingly being met by nuclear-fueled power plants. These plants require as fuel uranium enriched in the isotope uranium-235 which is present in natural ores in mixtures with uranium-238. For most commercial nuclear plants the uranium-235 must be increased from the naturally occurring 0.7 percent to two or three percent.

Current methods for isotope separation include electromagnetic separation, thermal diffusion, gaseous diffusion, distillation, ion migration, chemical exchange, jet diffusion, gas centrifugation, electrolysis and solvent extraction. The separation method of choice depends on many factors. For milligram to gram quantities, electromagnetic separators or mass spectrometers are suitable. For larger quantities any particular method may be advantageous: for example, hydrogen, by electrolysis of water or by distillation, nitrogen and oxygen, by chemical exchange, lithium by electrolysis or amalgam extraction. The degree of difficulty depends, in general, on the relative differences in some property of the isotopes, for example, the chemical reactivity or the diffusion rate. For large scale separations of heavy isotopes such as those of uranium the most economical current processes are gaseous diffusion, jet separation and gas centrifugation.

The gaseous diffusion process is based on the differences in diffusion rates of isotopic species of varying masses. The average velocities of the various molecular species are inversely proportional the the square roots of their masses. The lighter molecules in a mixture move with higher velocities and strike the walls of a container more frequently than the heavy. If the walls consist of a porous membrane with very fine holes, the lighter molecules will escape more frequently than the heavier molecules and the escaping gas will be enriched in the lighter species. A single stage of separation gives a degree of separation proportional to the square root of the ratio of the species masses. For the uranium-238 and uranium-235 hexafluorides the mass ratio is 352 to 349 and the maximum separation factor $\alpha$, defined as the ratio of heavy to light species in one exit stream divided by that in the other exit stream, is 1.0043. For any effective separation a multistage process, with a large number of stages, is required. Low gas pressures combined with high pressure ratios across the porous membranes and the large number of stages necessary for a significant degree of separation lead to high energy requirements for the process.

The gas centrifugation process makes use of a pressure gradient in a strong artificial gravitational field produced in the gas in a rotating vessel. Under the pressure gradient, the heavier molecules tend to migrate to the area of highest pressure. The separation factor depends on the difference in masses of the species as well as the mixture composition, angular velocity and geometry of the apparatus. The centrifuge process has the advantages of low energy requirements but the units are expensive and unreliable and the process has not been utilized in large-scale isotope separations.

The jet separation technique provides separation factors per stage somewhat greater than those of gaseous diffusion. The mixture of gases is forced through a nozzle and enters a low pressure chamber as a jet which is separated by a cone-shaped diaphragm into central and peripheral streams. The heavier isotope usually is enriched in the central gas stream. Pressure diffusion is thought to be the principal mechanism of separation. Addition of a lighter carrier gas results in an enhancement of separation. Compared to the gaseous diffusion process, jet separation requires a lower investment in equipment but energy requirements are larger for a given degree of separation.

In a modification of the jet separation process, the gas to be separated is expanded through a slit-shaped nozzle into a low pressure chamber along a concave wall. The curvature of the path of the high velocity stream produces a centrifugal effect and heavy species tend to migrate toward the wall. The stream is split by a vane at the exit into two streams of differing composition. Adding a light carrier gas increases the pressure gradient in the curving stream and enhances the separation. The process has a greater separation factor than the jet separation process but like that process has the same disadvantageous energy requirements.

In another modification of the jet separation process, the jet formed by expansion of the mixture through a nozzle is allowed to impinge on a blunt probe or a number of probes with entry holes for a part of the gas flow. The heavier molecules, because of their higher momentum, are able to penetrate the gas cloud at the probe more easily than the light molecules and the gas entering the probe(s) is enriched in the heavy species. The efficiency of the process in large scale separation of isotopes has not been determined.

In a third process using an apparatus similar to that of the jet separation process, the jet is formed by a secondary gas expanding into the chamber while the mixture of isotopes to be separated is added separately to the chamber as a background gas. Molecules of the isotopes are entrained into the jet in differing amounts and the jet becomes enriched in the lighter species. Again, the efficiency of the process in large scale separations has not been determined.

The energy requirements and overall costs of the gaseous diffusion, centrifugation and jet separation have been estimated recently as follows for the production of enriched uranium containing 3.0 percent U-235 from uranium with the normal concentration of 0.71 percent U-235:

| Process | Energy kilowatt hours kg of product | Total Cost U.S. Dollars kg of product |
|---|---|---|
| Gaseous diffusion | 133,000 | 100 – 135 |
| Centrifugation | 19,000 | 110 – 140 |
| Jet-separation | 300,000 | 75 – 150 |

The theoretical minimum energy requirement for uranium isotope separation, as predicted by the science of thermodynamics, is less than one kilowatt hour per kilogram of product. It is clear that previous methods for isotope separation and uranium isotope separation in particular require energies greatly in excess of the theoretical minimum.

The concept of the present invention is directed to a method and apparatus for separation of isotopic atomic and molecular species in gaseous form and utilizes the sciences of gas dynamics and molecular physics. It is the combination of these sciences that is essential to and characteristic of the present invention. In comparison to earlier known methods and equipment for isotope separation the method and devices of this invention offer advantages of lower energy requirements, reduction in equipment size and complexity, reduction in the number of components, and a higher degree of effectiveness.

The invention is based on the principle that at a given velocity heavier or smaller molecules penetrate further into a stopping gas in a given time. This has generally been recognized and has been called "persistence of velocities" in the kinetic theory of gases. A molecule entering a stopping gas experiences a number of collisions with the stopping gas molecules and because of the random nature of the collisions not all molecules travel the same distance in a given time. Molecules entering the gas at the same time are distributed about a mean distance which increases with increasing time. The width of the distribution depends on a number of factors: the ratio of masses of the entering to the stopping molecules, the initial entering velocity, the temperature of the stopping gas and the nature of the forces between molecules. With increasing time the entering molecules are slowed and eventually they are thermalized — attaining random velocities and directions corresponding to those at equilibrium at the temperature of the stopping gas. The width of the distribution of distances continues to increase with time as a result of molecular diffusion.

The efficiency of separation of species entering the stopping gas is dependent on the differences in the average distances travelled by each species entering the stopping gas and the width of the distribution of distances for each species. The greater the differences between the mean distances relative to the width of the individual species distributions, the greater the degree of separation. The width of the distribution of a single species is less for a high mass of that species relative to that of the stopping molecules and high velocity of the entering species relative to the random (or thermal) velocities of the stopping gas molecules.

The present invention makes use of the principle of gas dynamic acceleration of species in a jet to obtain high velocities. In the expansion of a gas mixture through a nozzle into a low pressure area, repeated collisions between the species result in nearly equal velocities for each species. At the same time expansion produces cooling of the gas stream and thus reduces the random thermal velocities associated with higher temperatures. The mixture to be separated may be passed through a nozzle with an added light gas to further increase velocities.

Similarly, the stopping gas may be expanded to high velocity and low temperature by expansion through a nozzle into a low pressure region. Alternatively, the stopping gas may be cooled by other means.

In brief, the invention involves providing a chamber in which a low-molecular-weight stopping gas is caused to flow and causing a jet of gas mixture to impinge on the stopping gas. The stopping gas flow is subsequently split into multiple streams each containing components of the original mixture enriched in one or more species relative to the composition of the original mixture. The components present in the stopping gas streams may be recovered from the stopping gas by conventional separation techniques.

Figure 2:
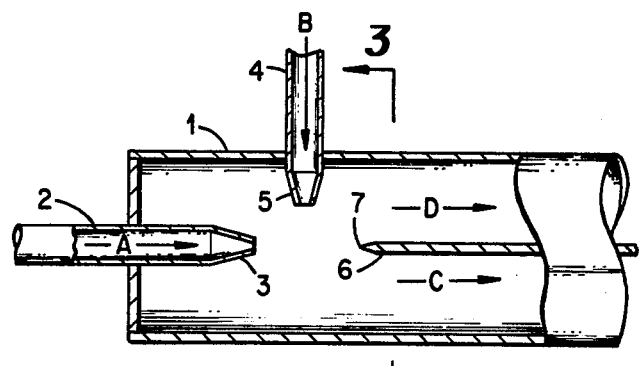
Figure 3:
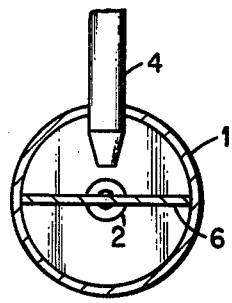

The invention is further illustrated by the descriptions following with reference to the accompanying drawings in which FIGS. 1, 2, and 3 are the top plan, side view, and elevational view, respectively, illustrating a simple form of apparatus embodying the teaching of the present invention.

As shown in FIGS. 1, 2 and 3, a chamber 1 is provided with an entry tube 2 and nozzle 3 through which the stopping gas A is fed. The gas mixture B is fed through another entry tube 4 and nozzle 5 to impinge on the stopping gas stream. Downstream of the intersection of the jets a partition 6 divides the flow into two parts C and D. The heavier (or smaller) species in the mixture penetrate further into the stopping gas stream and follow a path exiting with stream C while the lighter (or larger) species follow a path exiting with stream D.

A device of the type shown in FIGS. 1, 2 and 3 has been built and operated for the separation of a mixture containing approximately 10 mole percent argon and 90 mole percent helium. Dimensions of the apparatus were: chamber diameter, 1.5 inches; chamber length, 16 inches; location of partition edge 7, 0.5 inches downstream of axis of nozzle 5 and 1.5 inches downstream of nozzle 3; exit diameter of nozzle 5, 0.001 inches; exit diameter of nozzle 3, 0.010 inches. The stopping gas, hydrogen, was fed to nozzle 3 at a pressure of 10 psig while the mixture was fed to nozzle 5 at 5 psig. The chamber was evacuated to a pressure of approximately 0.5 torr by a vacuum pump connected to the exits for streams C and D. Analysis of the exit streams showed the ratio of argon to helium concentrations in stream C to be three times higher than in stream D. While the design of the device used is far from an optimum design to achieve a maximum sepatation, the validity of the principles of operation has been clearly demonstrated.

The applicability of the principles of the present invention to separations of species of different masses and different molecular sizes is further shown by calculations based on the kinetic theory of gases. In the treatment following the molecules of a gas mixture and of a stopping gas are assumed to behave as simple hard spheres. If the mass $m_p$ of a molecule entering a motionless stopping gas is very much larger than the molecular mass $m_s$ of the stopping gas molecules, the distance $z$ traveled by the entering molecules is given by $$z = \lambda \frac{m_p}{m_s} \ln(1 + v_o \frac{m_s}{m_p} \frac{1}{\lambda} t)$$

where $\lambda$ is the mean-free-path of the entering molecule in the stopping gas and $v_o$ is the entering velocity. In this case (with $m_p \gg m_s$) all molecules of the same $m_p$ and $\lambda$ entering the stopping gas at the same velocity travel the same distance in a given time. Entering molecules of higher $m_p$ travel farther than light molecules in a given time. Similarly, molecules of smaller size travel farther because of their larger mean-free-path.

In the case in which the ratio of $m_p$ to $m_s$ is approximately 100 the effects of the randomness of individual collisions cause a distribution of distances to obtain for molecules of the same $\lambda$, $m_p$, $v_o$ and $t$. To determine the distribution of distance is such a case we have calculated the distances travelled by several sets of molecules for which the randomness of individual collisions has been taken into account. The values of the parameters used were $v_o t/\lambda = 400$ and $m_p/m_s = 100$ and 101. The average distance travelled by one hundred particles was about 0.5 percent greater for the heavier molecules. The widths of the distributions were such that about 80 percent of the molecules were within 10 percent of the mean for each species. For these two distributions added together the one hundred molecules with the lowest distance were composed of 52 of the lighter molecules and 48 of the heavier molecules. This corresponds to a separation factor $\alpha$ equal to 1.17.

For separation of uranium hexafluorides of masses 348 and 352 using hydrogen of mass 2 as the stopping gas, the estimated separation factor is 1.23. This may be compared with the separation factor of 1.0043 for the gaseous diffusion process. Both of these factors represent theoretical maxima for ideal processes. Non-ideal behavior of real systems can reduce the factors in practice, but they are indicative of the relative efficiencies possible.

Various modifications can be incorporated in the basic apparatus disclosed in FIGS. 1, 2 and 3. For example, the stopping gas jet may expand into a diverging nozzle section occupying the entire chamber with the mixture jet entering at the wall. Either nozzle may be shaped to give parallel flow at the nozzle exit. Multiple jets for either gas may be used. The cross-sectional shape of either nozzle may be other than circular. The chamber may converge at the exits to provide recovery of pressure and reduce fluid pumping requirements. The stopping gas velocity need not be high and the gas may be refrigerated by means other than expansion. The stopping gas may be recirculated. A light gas may be added to the mixture to provide added acceleration to enhance separation.

What is claimed is:

1. A method for the separation of species of different weight or different molecular size contained in a gas mixture, comprising the steps of:

introducing a low-molecular-weight stopping gas in the form of a jet into a vacuum chamber;

expanding said gas mixture through a nozzle to form a gas mixture jet directed to impinge upon said stopping gas jet to effect spatial separation of said different species of said gas mixture within said stopping gas jet; and dividing said stopping gas jet downstream from the point of impingement of said gas mixture jet into separate streams which are respectively enriched in the separated species of said gas mixture.

2. The method of claim 1, wherein the gas mixture contains isotopic species to be separated.

3. The method of claim 2, wherein the gas mixture is accelerated by the addition of a low-molecular-weight gas.

4. The method of claim 3, wherein said stopping gas is introduced through a nozzle into the chamber.

5. The method of claim 4, wherein the gas mixture contains isotopes of uranium hexafluoride to be separated.

6. Apparatus for the separation of gas mixtures which comprises in combination, a chamber having inlet and outlet ports for the introduction of a gas mixture and a secondary gas and the discharge of these gases from the chamber, with a nozzle for the acceleration of the gas mixture to imping on the secondary gas, and provision for the segregation of exit gas streams.

7. Apparatus as defined in claim 6, wherein the gas mixture is accelerated by the addition of a low-molecular-weight gas.

8. Apparatus as defined in claim 6, wherein the gas mixture contains isotopes to be separated.

9. Apparatus as defined in claim 6, wherein the secondary gas stream is expanded through a nozzle into the chamber.

10. Apparatus as defined in claim 6, wherein the gas mixture contains isotopes of uranium hexafluorides to be separated.

* * * * *